United States Patent
Roddy et al.

(10) Patent No.: US 9,033,314 B1
(45) Date of Patent: May 19, 2015

(54) APPARATUS FOR ALIGNMENT AND SUPPORT OF FENCE RAILS

(71) Applicants: Kenneth J Roddy, Garland, TX (US); Jeffrey H Roddy, Richardson, TX (US)

(72) Inventors: Kenneth J Roddy, Garland, TX (US); Jeffrey H Roddy, Richardson, TX (US)

(*) Notice: Subject to any disclaimer, the term of this patent is extended or adjusted under 35 U.S.C. 154(b) by 0 days.

(21) Appl. No.: 14/190,083

(22) Filed: Feb. 25, 2014

Related U.S. Application Data

(60) Provisional application No. 61/769,066, filed on Feb. 25, 2013, provisional application No. 61/773,137, filed on Mar. 5, 2013.

(51) Int. Cl.
*E04H 17/26* (2006.01)
*F16L 3/12* (2006.01)

(52) U.S. Cl.
CPC .......................... *F16L 3/12* (2013.01)

(58) Field of Classification Search
CPC ................. E04H 2017/146; E04H 2017/1473
USPC ...... 256/1, 65.07, DIG. 4, DIG. 6; 248/218.4, 248/219.3, 219.4; 29/243.5, 243.55; 269/41, 36, 46, 904; 182/113, 134
See application file for complete search history.

(56) References Cited

U.S. PATENT DOCUMENTS

| | | | | |
|---|---|---|---|---|
| 305,776 A * | 9/1884 | Amstutz | ........................... | 269/36 |
| 683,909 A * | 10/1901 | Campbell | ..................... | 248/246 |
| 3,198,470 A * | 8/1965 | Owens | ..................... | 248/245 |
| 3,373,988 A * | 3/1968 | McKelvey | ..................... | 269/309 |
| 4,078,772 A * | 3/1978 | Carbone | ..................... | 256/24 |
| 4,485,543 A * | 12/1984 | Flores et al. | ..................... | 29/281.1 |
| 5,297,890 A * | 3/1994 | Commins | ..................... | 403/398 |
| 5,673,903 A * | 10/1997 | Lewis | ..................... | 269/41 |
| 6,041,891 A * | 3/2000 | Fullam et al. | ..................... | 182/134 |
| 6,296,233 B1 * | 10/2001 | Berg et al. | ..................... | 256/48 |
| 7,063,188 B1 * | 6/2006 | Liles | ..................... | 182/187 |
| 7,207,516 B2 * | 4/2007 | Sheelar | ..................... | 242/406 |
| 8,403,311 B2 * | 3/2013 | Ross | ..................... | 269/36 |
| 8,806,729 B2 * | 8/2014 | Roddy et al. | ..................... | 29/243.55 |
| 2003/0116760 A1 * | 6/2003 | Gravelle | ..................... | 256/1 |
| 2011/0132685 A1 * | 6/2011 | Dos Santos | ..................... | 182/113 |
| 2012/0080574 A1 * | 4/2012 | Mills | ..................... | 248/226.11 |
| 2014/0138891 A1 * | 5/2014 | Perry | ..................... | 269/46 |

* cited by examiner

*Primary Examiner* — Joshua Kennedy

(57) ABSTRACT

A visualization, alignment and support tool permitting one person fence rail installation, and greatly speeding the installation when more than two persons are employed. Specifically, the tool magnetically affixes temporarily to a fence pipe and offers support for a length of fence rail; especially the ends of adjacent fence rails, so that the rails are supported and level relative to a fence pipe bracket which is affixed to the fence pipe. The rail ends can then be fastened with screws or other fasteners to the fence pipe bracket when desired without further adjustment required.

4 Claims, 6 Drawing Sheets

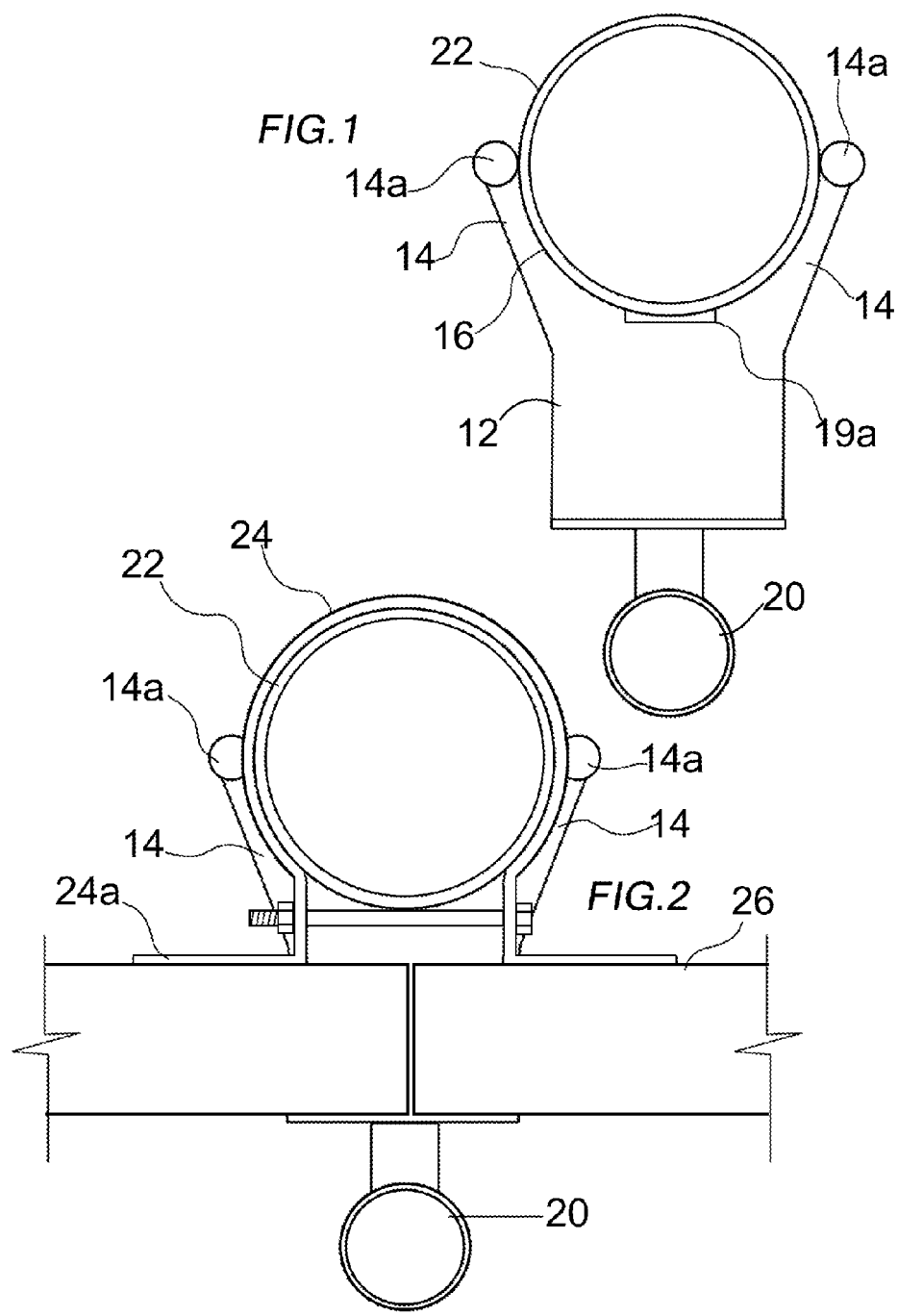

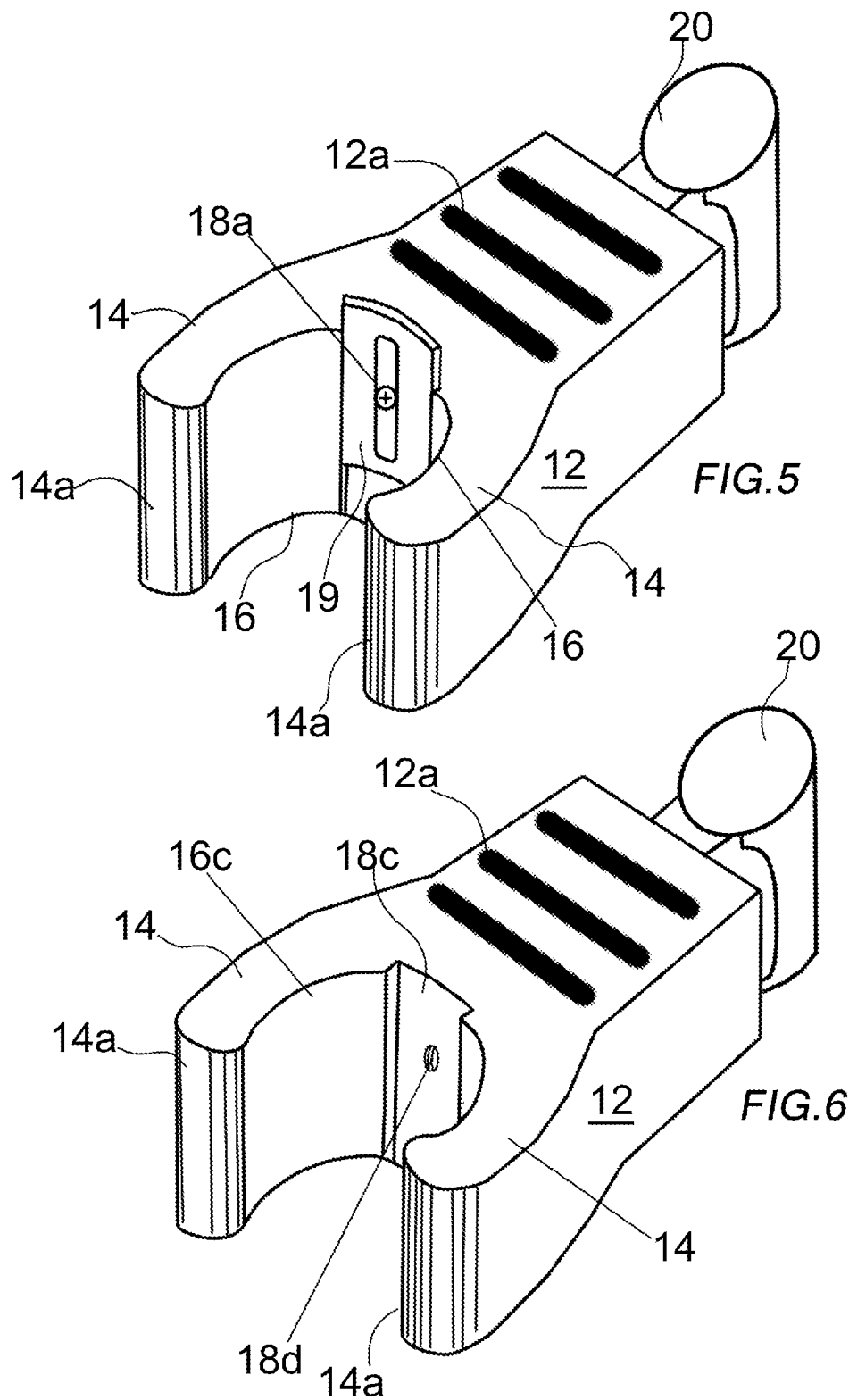

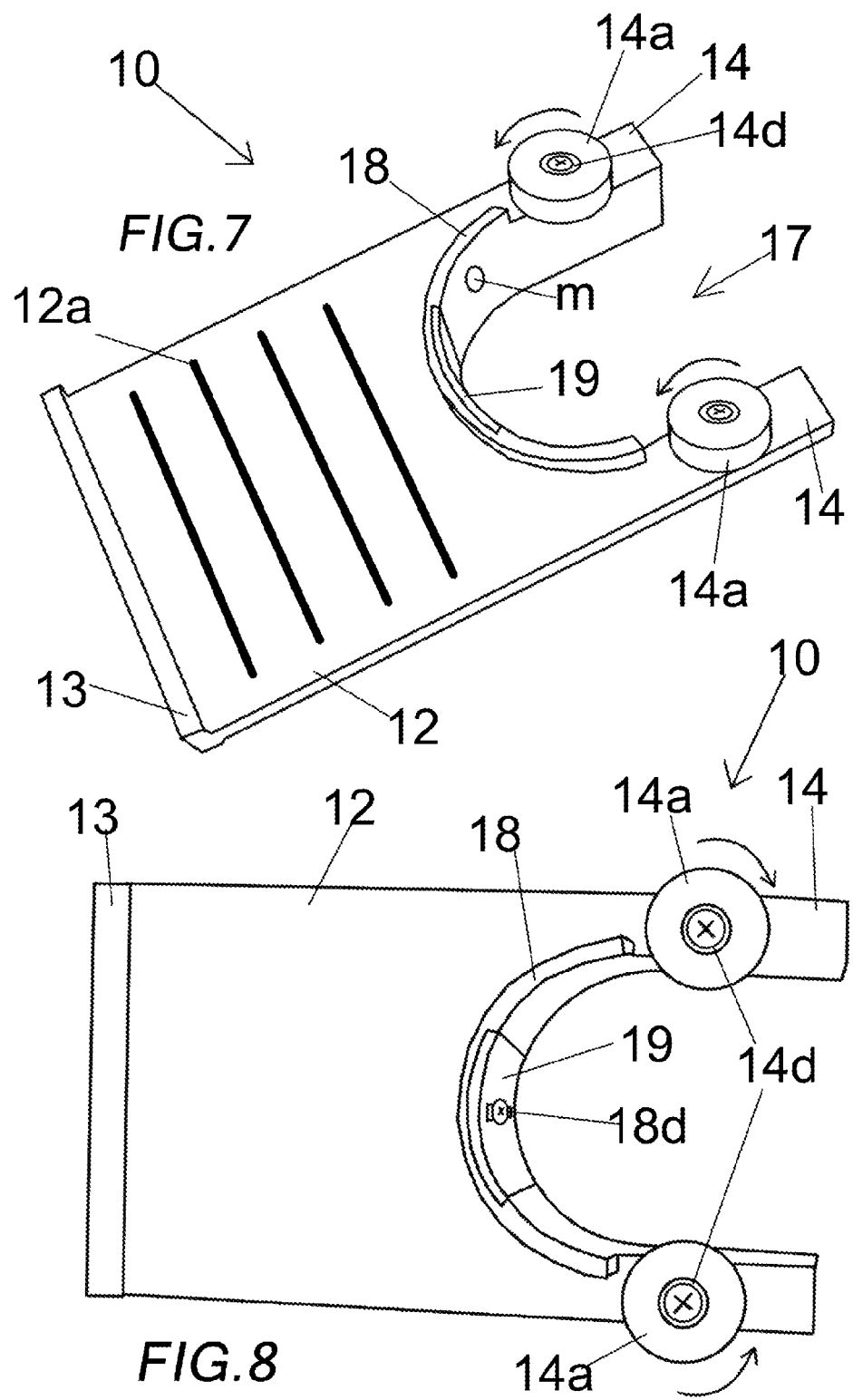

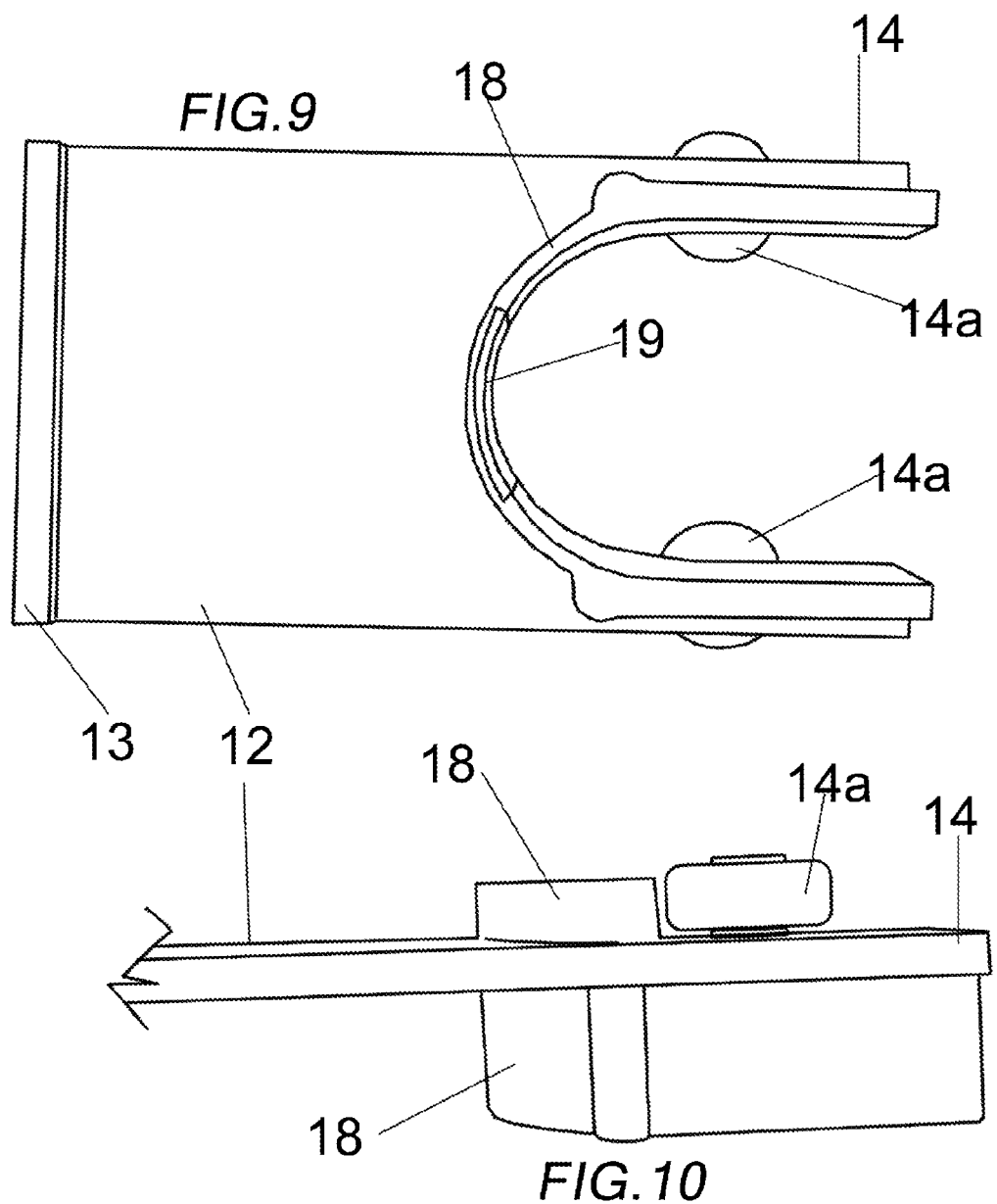

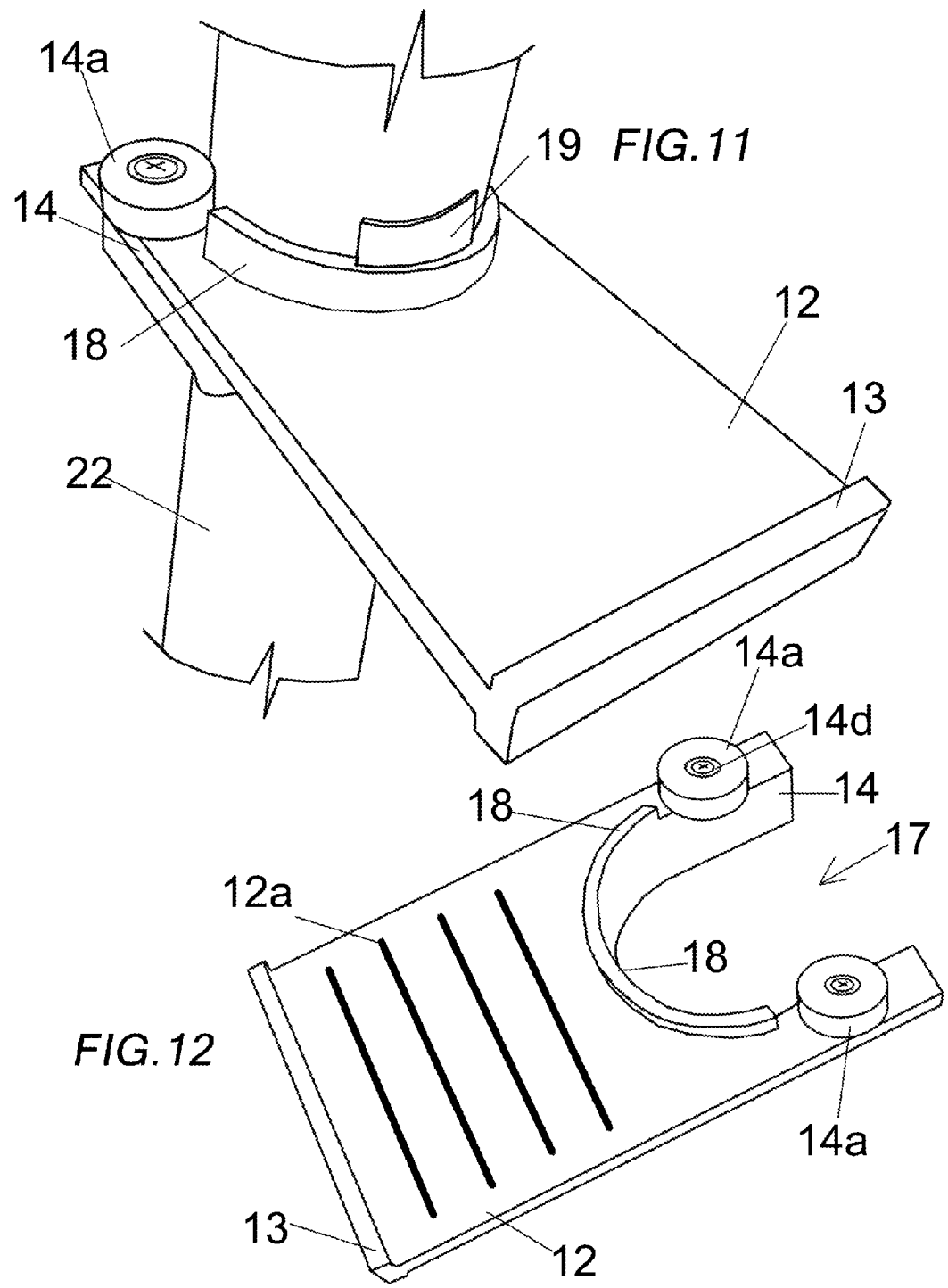

APPARATUS FOR ALIGNMENT AND SUPPORT OF FENCE RAILS

CROSS REFERENCE TO RELATED APPLICATIONS

This Application claims the benefit of U.S. Provisional Patent Application No. 61/769,066 filed Feb. 25, 2013 and U.S. Provisional Patent Application 61/773,137 filed Mar. 3, 2013.

FIELD OF THE INVENTION

This invention relates to the temporary support of a fence rail prior to the rail's attachment to a post bracket, especially for custom wooden fence construction.

BACKGROUND OF THE INVENTION

Natural wood rail and post fencing is the most common type of fence in the United States. Many consider this type of fencing to be more attractive than hurricane type fencing because it combines the strength and durability of metal posts or pipe with the privacy of a wooden pickets which can be painted or stained to suit the owner's preferences. Basically, posts of galvanized pipe are connected to horizontal wooden rails by a fence pipe bracket that is affixed to the fence pipe. There are several manufacturers of pipe brackets. For the purposes of this disclosure, the term "pipe bracket" refers generally to the type of bracket which is the subject of U.S. Pat. No. 5,297,890, currently marketed as the PGT pipe grip tie by Simpson Strong-Tie 5956 W. Las Positas Blvd., Pleasanton, Calif. Other structurally similar fence post brackets marketed as OZ-Post brackets, are in the same category. The foregoing brackets have a semi-circular portion that engages a fence pipe and possess a pair of adjacent flanges for the attachment of rail ends. The terms "post" or "pipe" as used herein are intended to refer to metal pipe-type fence posts.

Fence pipe brackets are typically installed 3 to a pipe for a fence having a height of 6 feet, or 4 to a pipe for an 8 foot high fence. Each pipe bracket is leveled with respect to a corresponding pipe bracket on an adjacent post. Leveling of a line of pipe brackets mounted to fence posts is done by string level or laser line and is an important determinant of fence quality. The last 3 or 4 inches of each rail are fastened by screws to a flange of the pipe bracket, and ideally abut the end of an adjacent rail that is fastened to the opposite flange of the pipe bracket. In this manner a continuous progression of rails down the fence line is established. At least two people are required to attach each rail; one individual tasked with affixing the rail end to the pipe bracket, while another individual supports the rail in a level orientation; usually in the middle of the rail or at the opposite end of the rail. While rails are often immobilized by applying the weight of the body against the rail to bring the flats of the rail ends in contact with the post bracket flanges, it is not uncommon for the individual supporting the fence rail to move slightly which necessitates repeat leveling of the rail. It would be desirable to have a tool that permits easy leveling of the rails by providing support and retention means as well as means to center the rail relative to the bracket, so that one person can perform the rail installation.

SUMMARY OF THE INVENTION

The present invention includes an apparatus which reduces the number of persons required for rail attachment, and greatly speeds fence construction. The apparatus mounts temporarily to the post just beneath a pipe bracket and offers support for the ends of fence rails so that the rails are supported and level relative to the fence bracket flanges for attachment thereto.

The apparatus includes at least a platform having an opening portion which admits a section of fence pipe, and an offset; either fixed or adjustable for setting the distance from the fence bracket to the platform to maintain consistent alignment and centering of the rails relative to the pipe bracket flanges.

A single apparatus may be used as an extra set of hands or used in multiples, with rails placed between each member of a pair.

The platform is made of any material capable of supporting at least one-half the weight of a common 2×4×8 fence rail; typically anywhere from 5 to 8 lbs. Suitable materials are stamped sheet metal, heat formed or molded plastic, die-cast metal, or any combination thereof. The opening is sized and shaped to receive a section of fence pipe, and has regions which surround and contact the pipe.

In one aspect of the present invention, the apparatus remains in position on the fence pipe with one or more magnetic members positioned or shaped to snugly contact a portion of the typically, 2⅜ inches diameter fence pipe. The fit is sufficiently close so that good magnetic contact helps retain the platform to the pipe in a position perpendicular to the pipe. The magnet can be arc-shaped or another shape affording sufficient contact with the fence pipe.

A rubberized coating adjacent to the magnetic member may be employed to provide frictional resistance to sliding movement. The platform preferably has two arms that encircle the fence pipe and terminate in two compressible members that when fitted around the pipe, fall just past the center point of the pipe. The compressible members provide tension against the pipe to snug the platform to the pipe. The compressible members, like any contacting region of the apparatus can have a rubberized or elastomeric coating to provide resistance to slippage.

In another aspect of the present invention, compressible members at the terminal ends of the arms of the platform roll past the center point of the fence pipe, being compressed and then relieved of compression once past the center point.

The compressible members can include an element of a suitable shape allowing it to be brought in an out of a position that is tightly contacting a portion of the fence pipe, as for example, a rubber bumper of any suitable size. Other compressible elements engaging with the platform and reversibly abutting the sides of the fence pipe will suggest themselves to those having skill in the art and benefit of this disclosure, and are intended to be encompassed by the present invention.

Other advantages of the present invention will become apparent from the following descriptions, taken in connection with the accompanying drawings wherein by way of illustration and example, a preferred embodiment of the present invention is disclosed.

BRIEF DESCRIPTION OF THE DRAWINGS

FIG. 1 is a top plan view of one embodiment of the present invention attached to a fence pipe 22;

FIG. 2 is a top plan view of one embodiment of the present invention attached to a fence pipe 22, and below a fence pipe bracket 24, and also showing a wooden rail being supported against the bracket;

FIG. 5 is an isometric view of one embodiment of the present invention;

FIG. 6 is another isometric view of one embodiment of the present invention showing the magnetic members and distancing members removed from the body of the tool;

FIG. 7 is a top perspective view of one embodiment of the present invention;

FIG. 8 is another top perspective view of one embodiment of the present invention;

FIG. 9 is a bottom perspective view of one embodiment of the present invention;

FIG. 10 is a side view showing a platform of the embodiment of (FIG. 7);

FIG. 11 is a perspective view of one embodiment of the present invention attached to a fence pipe, and held thereto by compressible members 14a;

FIG. 12 is is a top perspective view of one embodiment of the present invention with a non-adjustable, fixed width offset.

DETAILED DESCRIPTION OF THE INVENTION

Figure 3:
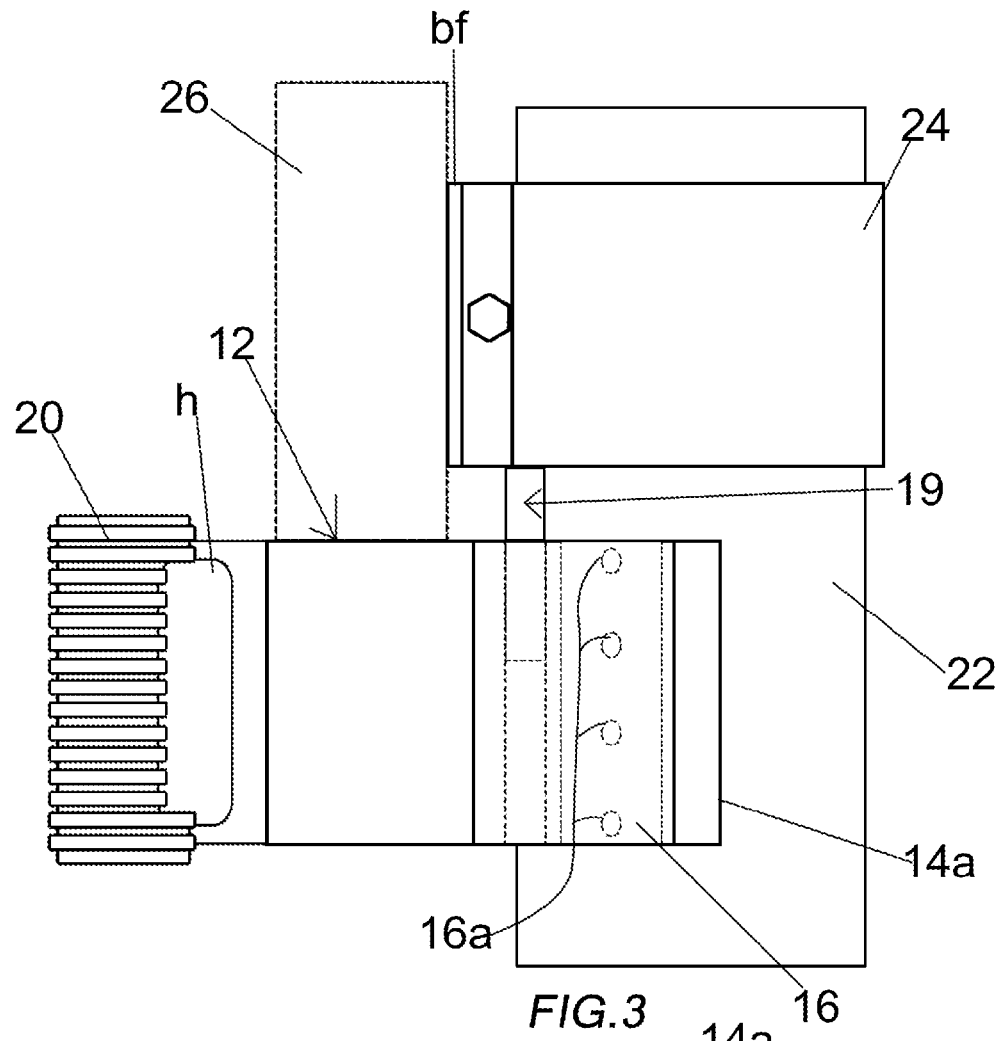
FIG. 3 is a side view of an embodiment of the present invention when attached to a fence pipe and positioned below a fence pipe bracket.

Reference Listing 10 rail support
12 platform
12a grippers
13 lip
14 arm
14a compressible member
16 magnetic member
17 opening
16a magnets
16c magnetic member recess
18 fixed offset member
18c inset
18d fastener
19 adjustable offset member
20 handle
22 fence pipe
24 pipe bracket
26 rail

DEFINITIONS

In the following description, the term "platform" refers to any type of small platform capable of supporting an end of a fence rail in a perpendicular position relative to the fence pipe to which it can be easily and reversibly secured. The terms "magnet" and "magnetic member" refer to magnets or magnetized metal elements. Unless otherwise explained, any technical terms used herein have the same meaning as commonly understood by one of ordinary skill in the art to which this disclosure belongs. The singular terms "a," "an," and "the" include plural referents unless the context clearly indicates otherwise. Similarly, the word "or" is intended to include "and" unless the context clearly indicates otherwise. Although methods and materials similar or equivalent to those described herein can be used in the practice or testing of this disclosure, suitable methods and materials are described below. The term "comprises" means "includes." All publications, patent applications, patents, and other references mentioned herein are incorporated by reference in their entirety for all purposes. In particular, U.S. PGPUB US 20130032774 is incorporated for reference in its entirety. In case of conflict, the present specification, including explanations of terms, will control. In addition, the materials, methods, and examples are illustrative only and not intended to be limiting.

Referring generally to FIGS. 1-12, rail support apparatus 10 includes a platform 12 which is preferably an injection molded body with an opening 17 adapted to receive a section of fence pipe between a pair of arms 14. The opening fits closely against a common fence pipe—transverse the pipe, so that the platform is supported thereon perpendicularly and supports a portion of a fence rail (FIG. 2). The opening may be arc-shaped as shown or have multiple non-contiguous points of contact. An offset 19 in contact with a bottom portion of fence bracket 24 (FIG. 3), provides a distancing means to assist users with centering the rail against a fence pipe bracket flange (bf) for attachment thereto by threaded fasteners. FIGS. 1-11 depict an adjustable offset that is inset in portions of the apparatus body (18c) and slides up and down. However, as depicted in (FIG. 12), a fixed length offset 18 can be formed directly into the top or bottom sides of the platform in the same location as the adjustable offset and thereby serve to center most mill dimensioned rails. An adjustable offset 19 can be inset within, or extend from a fixed width offset 18. In cases where there is an offset formed into both sides of the platform as shown in (FIG. 10), the offsets are preferably different widths in order to center at least 2 widths of mill dimensioned lumber. Accordingly, this disclosure is intended to cover one or more fixed length offsets 18 defining a distancing means. Adjustable offset 19 can have indicia thereon (not shown) to assist the user with non-uniform lumber. The distancing means may also include one or more shims placed directly under the rail on the platform. The distancing means can include a sliding and non-sliding offset, which can be employed with or without shims.

Figure 4:
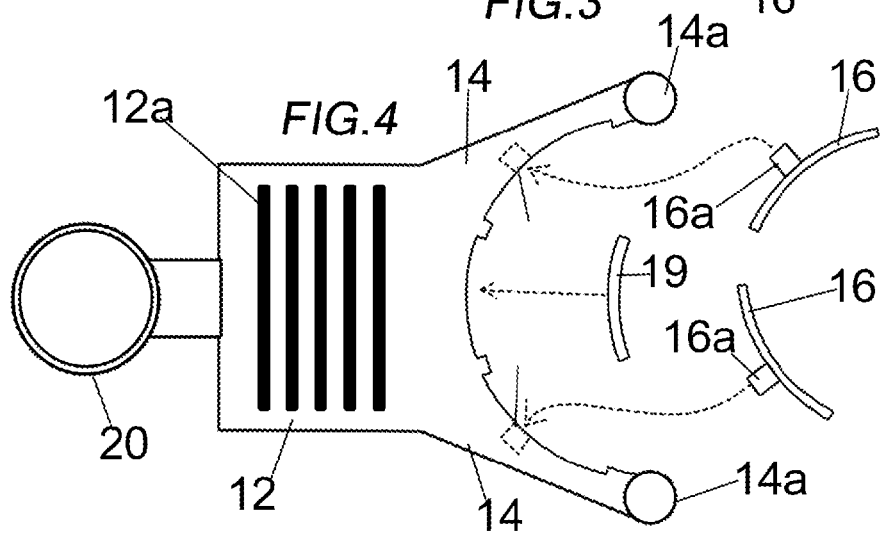
FIG. 4 is a top plan view showing a platform of the embodiment of (FIG. 1) with magnetic members 16 separated from the curved portion of the platform.

Turning to FIG. 4, an adjustable offset 19 fits into a molded recess that is typically beveled at the edges so as to retain the slidable offset. Curved sections 16 of ferrous material shaped and sized for intimate contact with the fence pipe provide magnetic attraction when disc magnets 16a are attached to the sections. Typically disc magnets are located inside of recesses formed in the tool and the curved sections placed thereover and contacting the magnets. While due to their small size and superior magnetic properties, neodymium magnets are preferred; alnico, ceramic ferrite and permanent steel magnets can be used. It is also possible that the magnets be directly contacting the fence pipe without intermediate materials. Grippers 12a, atop platform 12 are preferably elastomeric strips or ridges that are printed adhered to—or molded into the tool, in order to retain supported rails even if the rails are warped, cupped, or otherwise irregular.

FIG. 5 is an isometric view of the platform showing the curved magnetized members 16, and an adjustable offset 19 providing a offsetting means for separating the platform from the bracket at a required distance. FIG. 6 shows the platform with curved magnetized members 16 removed, and the recesses 16c they are affixed into by adhesive when assembled. A recess 18c for the adjustable offset is shown with a threaded apertures for a set screw that moves within slot 18a (FIG. 5).

Moving to FIG. 7, a lip 13 or fence extending from the platform between a user and the rail supporting section can also serve to secure the lumber close to the bracket flanges 24a. Lip 13 may be adjustable to slide toward and away from the supported rail by means of a slot in the platform (not shown).

FIGS. 7-12 include an embodiment according to the present invention wherein compressible members 14a are in the form of rubber bumpers or wheels that rotate about an axis. When opening 17 is placed around a section of pipe, the compressible members roll inwardly around the pipe being compressed, and then once past the centerline of the pipe, the compressible members are relieved and expand to maintain the platform in a perpendicular position relative to the fence pipe. In cases where rubber wheels are used as the compressible members, a portion of the wheel diameter inside the opening 17 is pushed past the widest portion of the fence pipe, first compressing the wheels and then decompressing the wheels so that the wheels finally reside at the side-rear of the pipe and press against the pipe, thus providing a friction fit. Preferably, the rubber wheels have a nylon bushing and are attached to the platform by a pop rivet, a molded stud or other fastener which allows the wheels to rotate to some degree. When the platform is temporarily affixed or removed from a fence pipe, the wheels roll against the pipe, reducing friction in the direction of movement and easing installation and removal. The compressible members can also be non-rolling; e.g., two bumpers placed inside the opening that compress and decompress, or as shown in (FIGS. 1-4) a pair of bulging portions or ridges molded into or onto the arms of the opening that are stressed apart when passed around the pipe and spring back when the bulging portions clear the widest portion of the pipe. Compressible members may also include flexible bumpers or protrusions mounted on the top or bottom of the platform in the same relative position as wheels 14a, or on the insides of the arms normally facing the fence pipe.

FIG. 10 is a side view of the rear section of the platform showing the compressible members 14a mounted to top facing surface of arms 14. FIG. 11 shows the platform mounted to a fence pipe with the compressible members abutting the side rear of pipe 22. FIG. 12 shows a fixed, non-adjustable offset 18 formed into the platform and adjacent opening 17.

Because the platform is supported perpendicular relative to the fence pipe, it is possible that a recess be formed in the platform for the insertion of a bulls eye or target type level that can be used to plumb the fence pipe. It is possible that a bulls eye level be clipped or otherwise temporarily attached to a side of the platform.

The platform or offsetting means can be formed from sheet stock, whether plastic, metal or other rigid material, molded or cast from metal or plastic materials or a composite. For standard milled lumber supplied in the nominal widths of 2.5 inches, 3.5 inches, and 3.75 inches, a fixed offsetting means can extend from both sides of the platform, permitting the platform to be flipped to accommodate (center) the various widths. For example, the fixed ridge of lesser height can center a 2.5 inch width rail relative to the most common pipe bracket, while the ridge of greater height centers the 3.75 inch width rail.

While the invention has been described by the embodiments given, it is not intended to limit the scope of the invention to the particular form set forth, but on the contrary, it is intended to cover such alternatives, modifications, and equivalents as may be included within the spirit and scope of the invention as defined by the appended claims.

What is claimed is:

1. An apparatus for the temporary support, positioning, and affixing of fence rails comprising:
   a cylindrical fence post; and
   a rail support, comprising:
   (1) a platform having a substantially planar surface capable of temporary support and retention of at least a portion of a fence rail, and an opening adapted to partially encircle a portion of the cylindrical fence post; and
   (2) attachment means including two arms adjacent the platform opening with a gap between the arms sufficiently wide to freely and transversely admit the portion of cylindrical fence post, with each arm having a compressible member that, when uncompressed, partially intrudes into the platform opening;
   wherein the compressible members are configured to roll along a circumference of the fence post and at least partially decompress to apply pressure to rear sides of the fence post slightly past a circumferential centerline of the cylindrical fence post when the portion of the cylindrical fence post is seated inside the platform opening of the rail support.

2. The apparatus according to claim 1 further comprising an offsetting member incorporated into the platform or placed on the platform for positioning a rail relative to a fence bracket selected from at least one of the following: fixed offset, adjustable offset, shims.

3. The apparatus according to claim 1 wherein the compressible members include an elastomer.

4. A system comprising:
   a cylindrical fence post;
   a fence pipe bracket mounted to the fence post; and,
   a rail support, comprising:
   (1) a platform having a substantially planar surface capable of temporary support and retention of at least a portion of a fence rail, and an opening adapted to partially encircle a portion of the cylindrical fence post; and
   (2) attachment means including two arms adjacent the platform opening with a gap between the arms sufficiently wide to freely admit the portion of the cylindrical fence post, with each arm having a compressible member that, when uncompressed, partially intrudes into the platform opening; and,
   wherein the compressible members of the arms are configured to roll along a circumference of the cylindrical fence post and partially decompress to apply pressure to rear sides of the cylindrical fence post slightly past a circumferential centerline of the cylindrical fence post when the portion of cylindrical fence post is transversely admitted by the platform opening, and
   whereby the rail support is configured to temporarily support a fence rail adjacent the fence pipe bracket.

* * * * *